United States Patent

Sato et al.

[11] Patent Number: 5,977,000
[45] Date of Patent: Nov. 2, 1999

[54] HIGH PURITY OPAQUE SILICA GLASS

[75] Inventors: Tatsuhiro Sato, Takefu; Akira Fujinoki, Koriyama; Kyoichi Inaki, Koriyama; Nobumasa Yoshida, Koriyama; Tohru Yokota, Koriyama, all of Japan

[73] Assignee: Shin-Etsu Quartz Products Co., Ltd., Fukui, Japan

[21] Appl. No.: 08/977,887

[22] Filed: Nov. 25, 1997

Related U.S. Application Data

[60] Division of application No. 08/682,962, Jul. 18, 1996, Pat. No. 5,772,714, which is a continuation-in-part of application No. 08/377,734, Jan. 25, 1995, abandoned.

[51] Int. Cl.$^6$ .............................. C03C 3/06; C03C 4/08; C03C 11/00
[52] U.S. Cl. .................. 501/39; 428/312.6; 501/54; 501/80; 501/904; 501/905
[58] Field of Search .................. 501/39, 54, 80, 501/900, 904, 905; 428/312.6

[56] References Cited

U.S. PATENT DOCUMENTS

| | | | |
|---|---|---|---|
| 1,229,324 | 6/1917 | Rosenblum | 65/32.1 |
| 2,982,053 | 5/1961 | Elmer | 65/32.1 X |
| 3,762,936 | 10/1973 | Iler | 501/54 |
| 4,072,489 | 2/1978 | Loxley et al. | 65/32.1 X |
| 4,332,907 | 6/1982 | Vieli | 501/39 |
| 4,332,908 | 6/1982 | Vieli | 501/39 |
| 4,416,680 | 11/1983 | Bruning et al. | 65/144 |
| 4,657,875 | 4/1987 | Nakashima et al. | 501/39 |
| 4,772,305 | 9/1988 | Elmer | 65/30.1 |
| 4,857,092 | 8/1989 | Meerman | 65/17.3 X |
| 4,963,178 | 10/1990 | Brown et al. | 65/144 |
| 4,978,641 | 12/1990 | Wada et al. | 501/39 |
| 4,983,370 | 1/1991 | Loritsch et al. | 423/340 |
| 5,100,841 | 3/1992 | Wada et al. | 501/39 |
| 5,149,474 | 9/1992 | Rohatyn | 264/63 |
| 5,174,801 | 12/1992 | Matsumura et al. | 65/17.3 |
| 5,585,173 | 12/1996 | Kamo et al. | 428/304.4 |

FOREIGN PATENT DOCUMENTS

| | | |
|---|---|---|
| 8-104540 | 4/1966 | Japan . |
| 56-23741 | 3/1981 | Japan . |
| 61-26523 | 2/1986 | Japan . |
| 162234 | 11/1989 | Japan . |
| 2-43720 | 10/1990 | Japan . |
| 5-900 | 1/1993 | Japan . |
| 59-254882 | 10/1993 | Japan . |
| 5-345636 | 12/1993 | Japan . |
| 7-33447 | 2/1995 | Japan . |
| 7-61827 | 3/1995 | Japan . |
| 7-69661 | 3/1995 | Japan . |
| 7-69674 | 3/1995 | Japan . |
| 932143 | 7/1963 | United Kingdom . |

*Primary Examiner*—Sean Vincent
*Attorney, Agent, or Firm*—Finnegan, Henderson, Farabow, Garrett & Dunner, L.L.P.

[57] ABSTRACT

Opaque silica glass having a density of 2.0 to 2.18 g/cm$^3$, sodium and potassium elements concentrations in the silica glass of each 0.5 ppm or less and an OH group concentration of 30 ppm or less, and containing bubbles which are independent bubbles having the following physical values: a bubble diameter of 300 $\mu$m or less, and a bubble density of 100,000 to 1,000,000 bubbles/cm$^3$, and a production process for opaque silica glass, including: filling quartz raw material grain having a particle size of 10 to 350 $\mu$m in a heat resistant mold, heating it in a non-oxidizing atmosphere from a room temperature up to a temperature lower by 50 to 150° C. than a temperature at which the above raw material grain is melted at a temperature-raising speed not exceeding 50° C./minute, then, slowly heating it up to a temperature higher by 10 to 80° C. than the temperature at which the quartz raw material grain is melted at the speed of 10° C./minute or less, and cooling after maintaining at the above temperature.

4 Claims, 3 Drawing Sheets

HIGH PURITY OPAQUE SILICA GLASS

This application is a division of application Ser. No. 08/682,962, filed Jul. 18, 1996, now U.S. Pat. No. 5,772,714 which is a C-I-P of application Ser. No. 08/377,734, filed Jan. 25, 1995 abandoned.

FIELD OF THE INVENTION

The present invention relates to a process for producing opaque silica glass which has a high purity and a high heat resistance and provides excellent thermal shielding, and more particularly to a process for efficiently producing solid opaque silica glass employed as an infrared light-diffusing and thermal shielding material for a heat treatment furnace.

BACKGROUND OF THE INVENTION

Silica glass has conventionally been used in furnaces and heat treating jigs for the semiconductor industry because it has a high purity and an excellent heat resistance. It is important that the temperature distribution in the above heat treatment furnace is uniform. To achieve this, a reactor tube is produced from opaque silica glass containing 100,000 bubbles/cm$^3$ or less, as found in Japanese Laid-Open Patent Publication No. H5 -900, or a heat shielding plate made of opaque silica glass containing less than 6,000 bubbles/cm$^3$ is provided at both ends of a boat on which a semiconductor wafer has been placed, as described in Japanese Laid-Open Utility Model Publication No. H1-162234.

In recent years, vertical furnaces have become widespread in the semiconductor industry. However, with this vertical furnace, the lower end of the furnace is put on a metal frame and heat rays are irregularly diffused at the joint of the furnace and the metal frame. Alternatively, a cooling unit provided for protecting a sealing member which seals the joining part of the flange of the furnace to the metal frame disturbs the furnace temperature so that the temperature distribution in the furnace is not uniform. It has therefore been usual to provide light diffusing and thermal shielding plates.

Opaque silica glass has been preferred as the light diffusing and thermal shielding material described above because of its good heat resistance and thermal shielding. The light diffusing and thermal shielding members made of opaque silica glass described above are generally cut out from a solid opaque silica glass block for ease of production. Further, a method where a mold is filled with quartz raw material granules, and in particular, rock crystal granules, which is then sintered in an electric furnace has been used for producing opaque silica glass block. However, since large cavities are formed at the center of the block in this conventional method, a high purity opaque silica glass block containing uniform bubbles and having excellent light diffusing and thermal shielding could not be produced. In addition, the bubble density of the conventional opaque silica glass was less than 100,000 bubbles/cm$^3$, as described in the above-mentioned Japanese Laid- Open Utility Model Publication No. H1-162234. Use of light diffusing members made of such opaque silica glass as light diffusing and thermal shielding members for vertical furnaces, which has recently become widespread in furnaces which are used for manufacturing semiconductors could not sufficiently prevent either irregular diffusion of heat rays at the joint of the flange of the vertical furnace and a metal frame, or deterioration of the furnace temperature due to a cooling unit provided for protecting the sealing member. Further, a conventional opaque silica glass member deforms significantly at high temperatures. Particularly, when heat-treating a silicon wafer up to 1000° C. or higher, an extended heating time causes large thermal deformation and prevents the opaque silica glass from functioning as a thermal shielding and light diffusing member, thereby shortening the life time of the furnace.

Investigation by the present inventors in order to solve the problems described above has resulted in the findings that thermal deformation of opaque silica glass at high temperatures is related to the density of bubbles and heat resistance of the silica glass, that thermal deformation is decreased by decreasing the whole volume of the bubbles in the opaque silica glass while decreasing the diameter of the bubbles and increasing the bubble density to increase the whole bubble cross section per unit volume of the opaque silica glass, and further that the heat resistance is improved by reducing the concentrations of sodium, potassium and OH groups each contained in the opaque silica glass in specific ranges or lower. It has been found that nitrogen element doping within a specific range into the silica glass is effective particularly for improving heat resistance and that this is particularly notable when synthetic quartz grain is used for raw material grain.

It has also been found that the opaque silica glass described above can be produced by using quartz raw material grain having a specific particle size and sintering it in a mold at a specific temperature-increase speed. In such a method for producing the opaque silica glass, however, problems still remain in the case of a large scale opaque silica glass block that a large scale heating source is required and a loss of product in production becomes large as compared with an medium scale opaque silica glass block containing uniform fine independent bubbles in the bulk which can be efficiently produced in a conventional method, and the product loss increase, because a large difference in temperature occurs between the upper and lower end portions of a filling layer of quartz grain filled in a mold and there may be, therefore, a chance where the production process is over while the upper end portion is still left unmelted. In the case of producing such a large scale opaque silica glass block, a special technique of heating is applied to producing of the large scale opaque silica glass block with none of the faults mentioned above, said special technique being that a belt-like heating source is located perpendicular to the trunk of a filling layer of quartz grain in a heat-resistant mold in order to form a heating zone in the quartz grain-filling layer, the heating zone is upwardly moved from the lower end portion of the quartz grain or to the contrary, downwardly moved from the upper end porton in a successive manner. The present invention has been completed based on such findings.

According to the method of the present invention, an opaque silica glass having a large bubble density, and allowing independent bubbles having a small size uniformly dispersed is able to be produced and besides, a large scale opaque silica glass block is easy to be obtained. The best kinds of thermal shield and light diffusing members can be manufactured at a low cost by slicing the silica glass block.

SUMMARY OF THE INVENTION

The first object of the present invention is to provide high purity opaque silica glass containing therein independent bubbles of small diameter whose concentration is high and which are uniformly dispersed.

The second object of the present invention is to provide heat-shielding and light diffusing members having high heat resistance and excellent heat-shielding properties.

The third object of the present invention is to provide a process for producing the high purity opaque silica glass having independent fine bubbles uniformly dispersed at a high density.

The fourth object of the present invention is to provide a process for producing a large scale opaque silica glass block with independent fine bubbles uniformly dispersed at a high density.

The present invention for achieving the objects described above relates to opaque silica glass having a density of 2.0 to 2.18 g/cm$^3$, the sodium and potassium concentrations of which are each 0.5 ppm or less, the OH group concentration of which is 30 ppm or less, and containing independent bubbles having the following physical values:

(1) a bubble diameter of 300 μm or less, and (2) a bubble density of 100,000 to 1,000,000 bubbles/cm$^3$, and to a production process therefor.

DETAILED DESCRIPTION OF THE INVENTION

Figure 1:
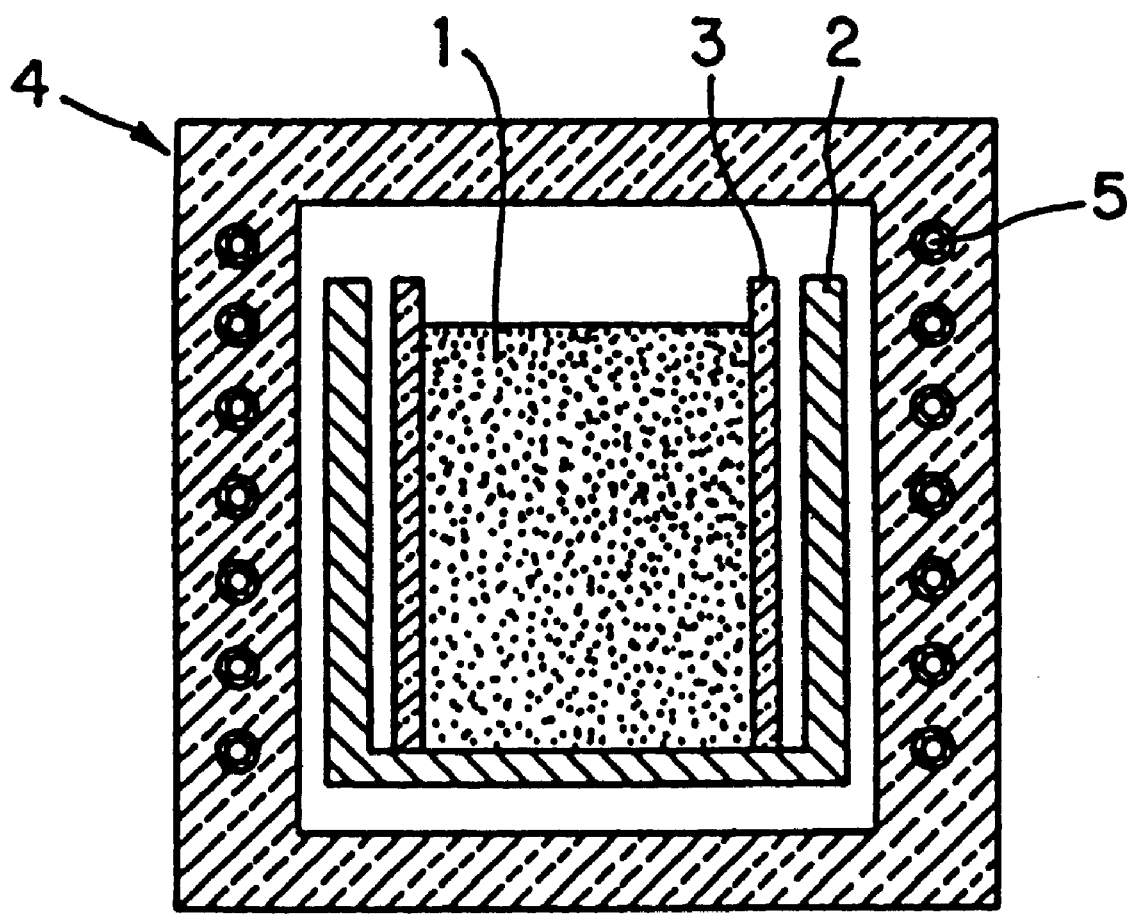
FIG. 1 is a schematic view of a process for producing an opaque silica glass of the present invention using a silica glass mold.

The opaque silica glass defined in the present invention means opaque silica glass containing independent fine bubbles, obtained by heating and sintering and melting quartz raw material grain in a non-oxidizing (e.g. reduction atmosphere, inert atmosphere) atmosphere. High purity crystalline quartz grain and high purity amorphous silica grain having particle sizes of 10 to 350 μm are used as raw materials for producing this opaque silica glass. Particularly preferred are high purity quartz grain having sodium and potassium concentrations of 0.5 ppm or less among the alkaline metal elements or quartz grain obtained by chemically purifying high purity rock crystal grain to reduce the concentrations of sodium and potassium to 0.5 ppm or less as described in U.S. Pat. No. 4,983,370, and amorphous quartz grain which is synthetic quartz glass obtained by a soot method, whose sodium and potassium concentrations are adjusted to 0.5 ppm or less, and whose particle size is 10 to 350 μm. In addition to the above, heat resistance is furthermore increased by subjecting the quartz raw material grain to an ammonia doping treatment to adjust the nitrogen concentration in the opaque silica glass to 50 to 500 ppm. This is particularly notable when synthetic quartz grain is used as the material grain. For example, the opaque silica glass for which ammonia doped-treated natural quartz grain is used and which has a nitrogen concentration falling in the range described above has a viscosity of $10^{12.8}$ poise at 1,260° C., exceeding the $10^{12.2}$ poise viscosity corresponding to the viscosity of opaque silica glass produced from natural quartz grain. It is assumed that doping of nitrogen into the opaque silica glass described above generates an Si—N bond which is stronger than an Si—O bond, thus increasing high temperature viscosity. Further, the doping of the nitrogen element allows an NH group to exist, and absorption occurs at a wavelength of 3,400 cm$^{-1}$, improving absorption of infrared rays, which leads to a further reduction in a transmittance of heat rays. The above nitrogen content of less than 50 ppm cannot increase high temperature viscosity, and a content exceeding 500 ppm unfavorably allows nitrogen gas to be released during use. Further, reducing lithium concentration to 1.0 ppm or less is preferred as well for improvement of the heat resistance of the opaque silica glass.

An electric fusion method providing a reduced OH group-mixed amount is employed for melting the quartz raw material grain described above. The OH group concentration of 30 ppm or less in the opaque silica glass can prevent viscosity reduction in the silica glass at high temperatures attributable to the OH group.

It is said that in heat conduction of the silica glass, radiation heat conduction is dominant when the temperature is raised to 1,000° C. or higher. The existence of bubbles in the silica glass allows heat radiation at the temperature described above to reflect not only on the glass surface but also on the bubbles existing therein. Thus, since the bubbles contained in the silica glass and the distribution thereof exert a significant influence on reflection and transmission of heat radiation, it is essential to uniformly disperse the bubbles as well as to increase the whole cross-sectional area of the bubbles in the opaque silica glass when the opaque silica glass is used for thermal shielding and light diffusing members for heat treatment furnaces of silicon wafer.

Uniformly dispersing the large bubbles in the opaque silica glass is effective for increasing the whole cross-sectional area of the bubbles. However, according to research carried out by the inventors of the present invention, it has been found that thermal shielding and light diffusing members made of the opaque silica glass containing large bubbles has large heat deformation at high temperatures. Since the larger the whole volume occupied by the bubbles contained in the opaque silica glass, the larger the heat deformation at high temperatures, the inventors of the present invention carried out experiments based on the idea that decreasing the volume of bubbles contained in the opaque silica glass and increasing bubble density would lead to total increase in the overall cross-sectional area of the bubbles, and found that setting the diameter of the bubbles to 300 μm or less, preferably 20 to 180 μm and setting the density thereof to 100,000 to 1,000,000 bubbles/cm$^3$ markedly improves the thermal shielding of the opaque silica glass. This opaque silica glass was measured for a transmittance of light having a wavelength of 0.2 to 5 μm, and it was found that this was 10% or less in the case of a sample having a thickness of 4 mm.

The opaque silica glass of the present invention is required to have a density limited to 2.0 to 2.18 g/cm$^3$ in order to suppress deformation by its own weight to a minimum level.

As described above, the opaque silica glass of the present invention has a large bubble density, allows independent bubbles having a small size to be uniformly dispersed, provides an apparent high temperature viscosity and excels in a heat resistance, light diffusing and thermal shielding. This prevents a thermal shielding and light diffusing member made of the opaque silica glass of the present invention from deforming due to heat even when subjected to heat treatment at a temperature exceeding 1,000° C. for relatively extended periods of time such as in the heat treatment of silicon wafer.

The opaque silica glass of the present invention is directed to a process for producing opaque silica glass having a density in a range of 2.0 to 2.18 g/cm$^3$ and containing independent bubbles having a bubble diameter of 300 µm or less and a bubble density of 100,000 to 1,000,000 bubbles/cm$^3$.

The present invention comprising the following steps; filling high purity quartz raw material grain described above in a heat resistant mold; heating the quartz preferably, in a non-oxidizing atmosphere from room temperature up to a temperature lower by 50 to 150° C. than the temperature at which the above quartz raw material grain melts at a temperature increase speed which does not exceed 50° C./minute, preferably 10 to 40° C./minute; followed by slowly raising the temperature up to a temperature higher by 10 to 30° C. than the temperature at which the above quartz raw material grain melts at a temperature-increase speed of 10° C./minute or less. Thereafter, it is kept at the above temperature for a fixed period and then cooled to thereby produce the opaque silica glass of the present invention. Since the temperature-increase speed and the maintained time are changed according to the kind and particle size of the quartz raw material grain, the optimum temperature-increase speed and maintained time are required to be set in the range described above according to the quartz raw material grain. In particular, in order to produce high quality opaque silica glass in which independent fine bubbles are uniformly dispersed, the temperature is preferably raised by providing a temperature difference between the temperatures of an upper and a lower end portions in a filling layer of the quartz raw material grain. The temperature difference falls in a range of 10° C. or more.

The particle size of the quartz raw material grain used in the above-mentioned process for production falls within a range of 10 to 350 µm. Particle sizes exceeding this range cannot provide uniform bubbles, and at less than the above range bubbles do not form. The particle size range described above means a situation where sieving by means of a sieve having an opening of 350 µm results in no particles remaining in the sieve. Further, introducing nitrogen element into this quartz raw material grain improves the heat resistance of the opaque silica glass. Heating the quartz raw material grain at a temperature range of 600 to 1,300° C. in an ammonia atmosphere is preferred as the doping method. The treatment described above gives a nitrogen content of 50 ppm to 600 ppm in the opaque silica glass and raises heat resistance.

In a process for producing of the above opaque silica glass, inserting a silica glass molding frame into a heat resistant mold and filling the quartz raw material grain thereinto to melt it allows the quartz raw material grain to shrinkby 10 to 20% when melting, thus generating a gap between the silica glass molding frame and the quartz raw material grain layer, and so-called grain dropping results, in which the quartz raw material grain drops therein from an upper part of the quartz grain-filling layer, and may form cracks in the opaque silica glass. However, the viscosity of a silica glass tube decreases and it is deformed by its own weight so as to fill up the gap described above. Accordingly, the opaque silica glass obtained has no cracks, and high quality opaque silica glass can be produced. Further, since the silica glass molding frame described above protects the silica glass from the heat resistant mold, the opaque silica glass is prevented from being contaminated by contaminants in the heat resistant mold (e.g. graphite). Insertion of a silica glass molding frame enables the transmittance distribution of the opaque silica glass to be equalized in a lateral direction. This is attributable to the fact that, since the silica glass has less heat conductivity than graphite, abnormal temperature elevation on the surface of the quartz raw material grain during melting can be suppressed. A quartz glass tube and a molding frame formed by building silica glass blocks are used for the silica glass molding frame described above. A mold made of high purity ceramics, particularly a high purity graphite mold, is suitable for the heat resistant mold. The filling height of the quartz raw material grain filled into the respective molds described above is suitably set to 300 mm or lower. That exceeding this range may not uniformly disperse bubbles.

Nitrogen gas is preferred for the non-oxidizing atmosphere gas used in melting the opaque silica glass described above. Active gas is replaced with inert gas by melting in this non-oxidizing atmosphere gas, and the active gas contained in the bubbles is decreased.

Figure 2:
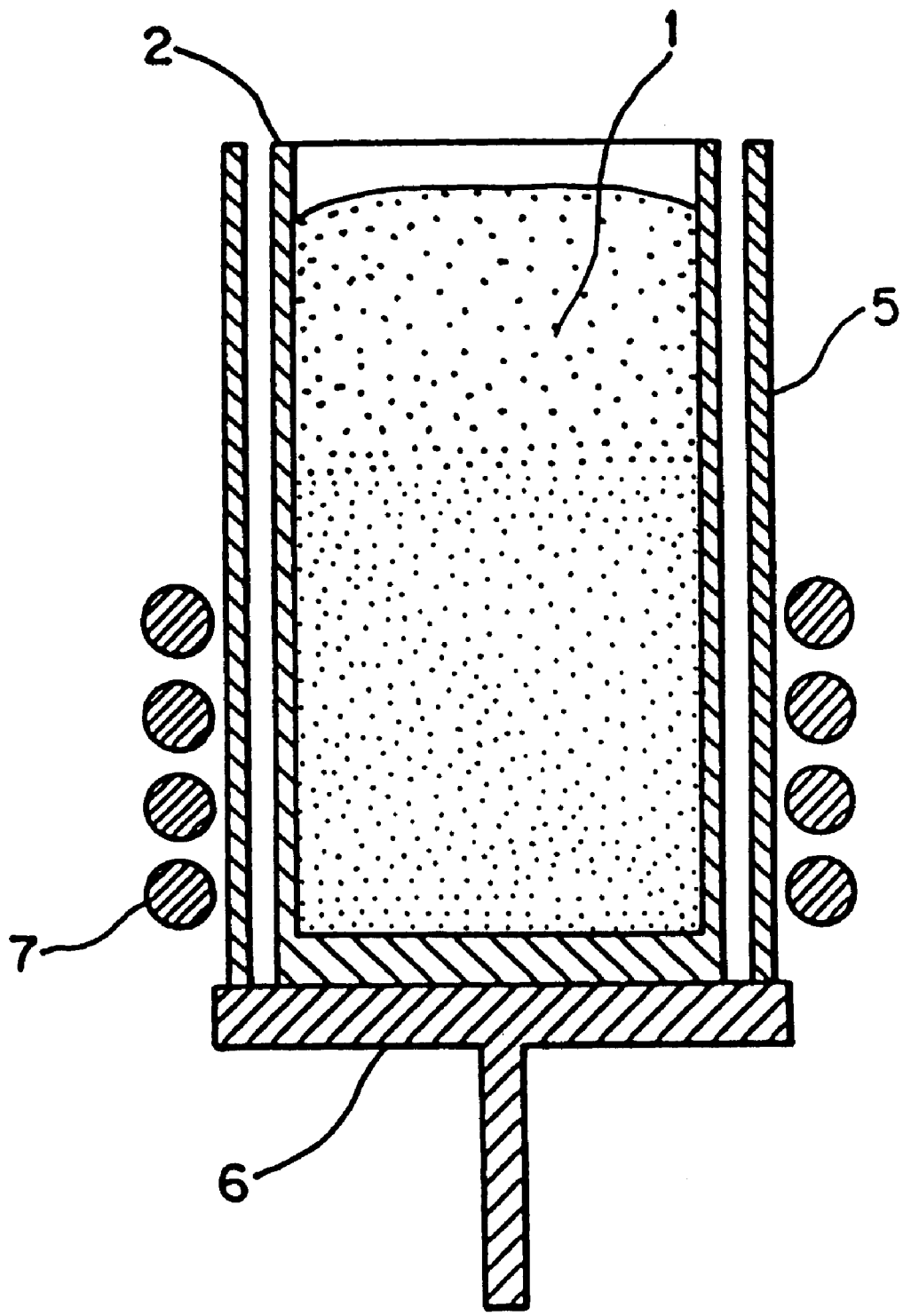
FIG. 2 is a schematic view of a process for producing an opaque silica glass block wherein a heating zone generated with a belt-like heating source is successively moved either upwardly from the lower end portion or downwardly from the upper end portion.
Figure 3:
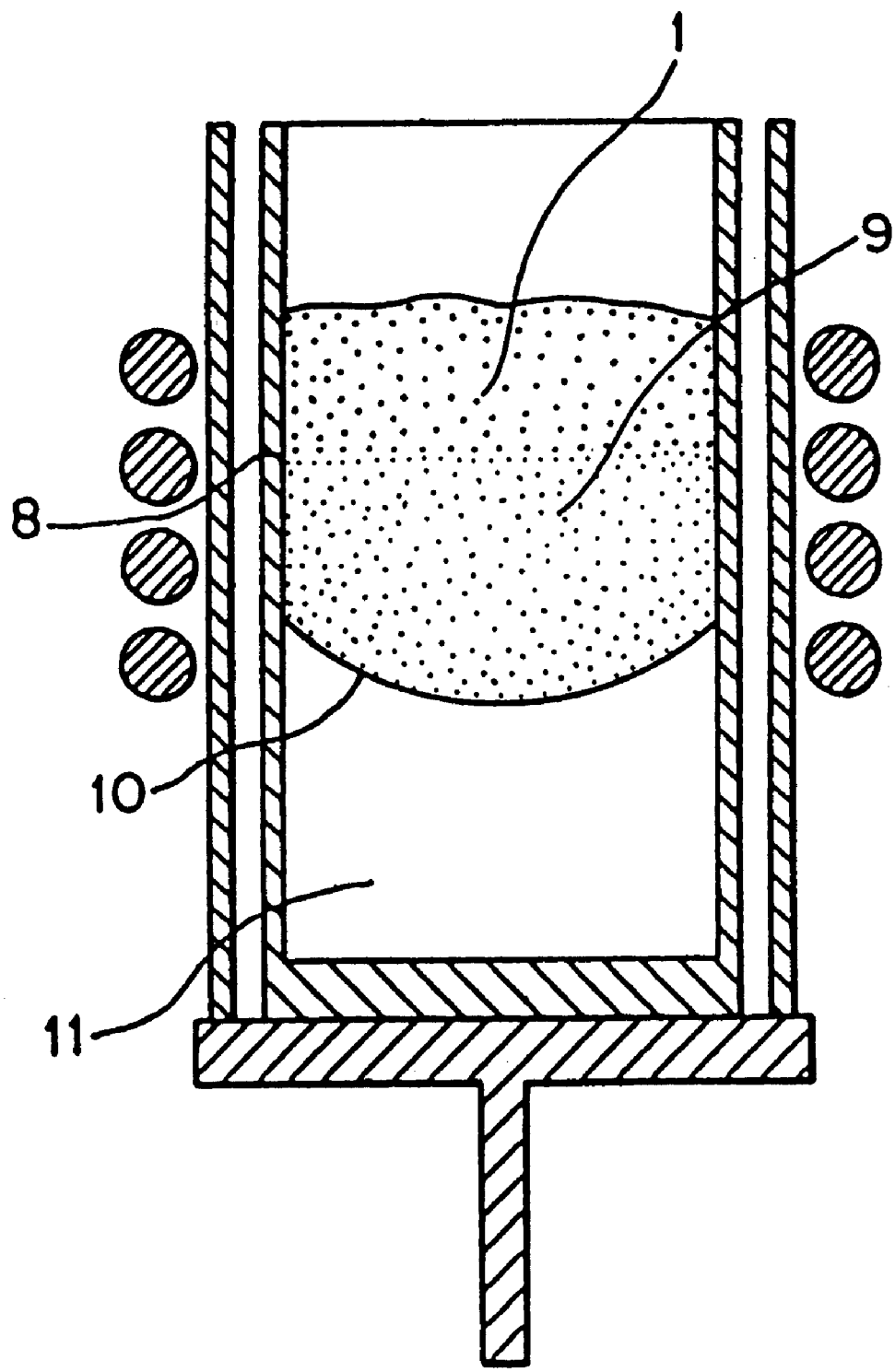
FIG. 3 is a schematic view illustrating a melting state of a quartz raw material grain in a mold in a process for producing an opaque silica glass block wherein a heating zone generated with a belt-like heating source is successively moved either upwardly from the lower end portion or downwardly from the upper end portion.

A large scale opaque silica glass block is preferably produced by a process shown in FIG. 2, wherein 1 indicates quartz raw material grain, 2 indicates a heat-resistant mold, 5 indicates a heating furnace, 6 indicates a table of a lifter, and 7 indicates a belt-like heating source. The process comprises the steps of; filling quartz raw material grain 1 in the heat-resistant mold 2; placing the mold 2 on the table 6 of the lifter; moving upwardly or downwardly the table 6 with the mold 2 to thereby successively move a heating zone formed by the heating source 7 either upwardly from the lower end or downwardly from the upper end. Such a method is hereinafter called a zone-melting method. In the zone melting method, the table 6 of the lift is fixed, to the contrary, and the belt-like heating source 7 is successively moved either upwardly from the lower end or downwardly from the upper end in order to form a melting zone moving along a filling layer of quartz raw material grain. In such a molten zone of the quartz raw material grain, the solid-melt interface sectionally has the shape of either a convex or concave parabolic curve 10 extending between the and central portion 9 and the portion 11 of the trunk of the quartz grain 1 in the mold 2 and such an interface moves together with the molten zone are differently set for different diameters of the trunk of a filling layer filled with quartz grain in molds such that a moving rate in a range of 0.5 mm/min to 2 mm/min is preferably selected for a diameter less than 500 mm of the trunk of the filling layer and that less than 0.5 mm/min is preferably selected for a diameter more than 500 mm. With the latter moving rates of the molten zone, even a large scale opaque silica glass block having a diameter more than 500 mm can be produced not only with none of cavities but also with independent bubbles uniformly dispersed therein. In the zone-melting method, a large scale heating source is not required and therefore, loss of heating energy can be minimized, because heating is limited to the shape of a zone, replaced with an inert gas, when an non-oxidixing atmosphere is used.

The following examples are given to specifically explain the present invention, and these examples do not limit the scope of the present invention.

EXAMPLES

The following measuring methods are used in the examples.
  i) Thermal diffusivity: value measured by a laser flash method.
  ii) Specific heat: value measured by an adiabatic continuous method.

iii) Heat conductivity: value measured by a heat ray method.
iv) Bubble density/bubble distribution: according to DIN 58927, a thin section of the opaque silica glass having a fixed volume is photographed with transmitted light to count the number of bubbles contained therein, and the number is converted to a per $cm^3$ value of the opaque silica glass.
v) Glass density: value measured by Archimedes' method.
vi) OH group concentration: value measured by FT-IR.
vii) Apparent viscosity: a sample is cut out in a strip of 3×1×50 mm, and a value is calculated from the deformation amount given when the sample is maintained at 1,260° C. for 10 hours according to a beam bending method (supported at two points with no load).
viii) Nitrogen element concentration: value measured by an inert gas melt conductivity method.
ix) Gas amount in bubbles: value obtained by measuring gas coming from bubbles after breaking an opaque silica glass piece by gas chromatograph mass spectrometry.

The raw material used in Examples 1 to 2 and Comparative Examples 1 to 3 are a quartz grain A obtained by removing particles having a particle size of 250 μm or more and a quartz grain B obtained by removing particles having the particle size of 180 μm or more, and these are shown in Table 1, the particle size distributions thereof (meaning the weight ratio of the quartz grain remaining in a sieve having a mesh aperture shown in the particle size column when quartz grains are sieved).

TABLE 1

| Particle size (μm) | >300 | >250 | >212 | >180 | >150 | >103 |
|---|---|---|---|---|---|---|
| Raw material | 2 | 22 | 31 | 14 | 5 | 26 |
| Quartz grain A | 0 | 0 | 40 | 18 | 7 | 35 |
| Quartz grain B | 0 | 0 | 0 | 30 | 11 | 59 |

Note: The numerals in the table represent weight %.

Note: The numerals in the table represent weight %.

Example 1

The quartz grain A described above was put in an electric furnace having a silica glass tube for a reactor tube, and was subjected to heat treatment in hydrogen chloride/nitrogen of 50:50 at 1,200° C. for one hour to purify alkali metals. This purified quartz grain A was filled into a high purity graphite mold having an inside diameter 200 mm×height 200 mm up to the depth of 100 mm, and was settled in a vacuum furnace to remove the air remaining between the particles by vacuum-exhausting to $10^{-2}$ Torr or less. Then, the vacuum in the furnace was broken with nitrogen gas, and the temperature was raised from room temperature up to 1,200° C. at a speed of 20° C./minute, from 1,200° C. to 1,630° C. at 6.14° C./minute and from 1,630° C. to 1,750° C. at 0.34° C./minute while circulating the nitrogen gas at a flow amount of 5 l/minute, followed by maintaining the temperature at 1,750° C. for 50 minutes. After vitrification, supply of electricity to the furnace was stopped to cool it spontaneously. A sample was cut from the opaque silica glass block thus obtained, and this sample was measured for thermal diffusivity, specific heat, heat conductivity, bubble density, whole bubble volume, glass density, and bubble distribution. The measuring results of the former three are shown in Table 2, and those of the latter in Tables 3 and 4.

TABLE 2

| Temperature (° C.) | Thermal diffusivity ($cm^2$/sec) | Specific heat (cal/g · ° C.) | Heat conductivity (cal/cm · sec · ° C.) |
|---|---|---|---|
| 20 | 0.0082 | 0.17 | 0.0030 |
| 200 | 0.0074 | 0.22 | 0.0035 |
| 400 | 0.0070 | 0.25 | 0.0038 |
| 500 | 0.0069 | 0.26 | 0.0039 |
| 600 | 0.0070 | 0.28 | 0.0041 |
| 700 | 0.0071 | 0.28 | 0.0042 |
| 800 | 0.0071 | 0.29 | 0.0044 |
| 900 | 0.0071 | 0.29 | 0.0045 |
| 1,000 | 0.0074 | (0.30) | 0.0047 |
| 1,100 | 0.0076 | (0.30) | 0.0049 |
| 1,200 | 0.0080 | (0.30) | 0.0052 |

As is apparent from the results shown in above Table 2, it can be found that the opaque silica glasses of the present invention have low heat conductivity and excellent thermal shielding.

Example 2

After the quartz grain B was subjected to removal of alkaline metal elements under the same conditions as those in Example 1, it was vitrified while controlling the melting temperature in the same manner as in Example 1, to thereby obtain an opaque silica glass block. A sample was cut from the opaque silica glass block to measure the bubble density, whole bubble volume, glass density and bubble distribution thereof. The results thereof are shown in Tables 3 and 4.

Comparative Example 1

After the raw material was subjected to removal of alkaline metal elements under the same conditions as those in Example 1, it was filled into a graphite mold to produce an opaque silica glass block in the same manner as in Example 1. A sample was cut from the opaque silica glass block thus obtained to measure the bubble density, whole bubble volume, glass density and bubble distribution thereof. The results thereof are shown in Tables 3 and 4.

Comparative Example 2

The quartz grain A was filled into a graphite mold as was, without subjecting it to alkaline metal removal treatment, and was melted for vitrification under the same conditions as those in Example 1 to thereby obtain opaque silica glass. A sample was prepared from the opaque silica glass block to measure the bubble density, whole bubble volume, glass density and bubble distribution thereof. The results thereof are shown in Tables 3 and 4.

Comparative Example 3

After the quartz grain A was subjected to alkaline metal removal treatment, it was subjected to rotational molding and melted by heating from the inside with an arc flame in the open atmosphere to thereby produce an opaque silica glass block. A sample was cut from opaque silica glass block to measure the bubble density, whole bubble volume, glass density and bubble distribution thereof. The results thereof are shown in Tables 3 and 4.

Comparative Example 4

Raw material was sieved to separate only quartz grains having a particle size of 103 mm or less and an average particle size of 50 μm, and was subjected to alkaline metal removal treatment in the same manner as that in Example 1. Then it was melted by heating to produce an opaque silica glass. A sample was cut from the opaque silica glass block to measure the bubble density, whole bubble volume, glass density and bubble distribution thereof. The results thereof are shown in Tables 3 and 4.

TABLE 3

|  | Bubble density (bubbles/cm³) | Whole bubble volume (%) | Glass density (g/cm³) |
|---|---|---|---|
| Example 1 | 270,000 | 7.8 | 2.125 |
| Example 2 | 478,200 | 8.8 | 2.115 |
| Comparative Example 1 | 80,800 | 6.8 | 2.135 |
| Comparative Example 2 | 153,400 | 5.8 | 2.150 |
| Comparative Example 3 | 62,000 | 3.8 | 2.165 |
| Comparative Example 4 | 1,163,000 | 15.8 | 2.050 | parative examples described above, and the distribution thereof is uniform. The alkaline metal element concentration, OH group concentration and apparent viscosity (1,260° C.) in the opaque silica glasses prepared in Examples 1 and 2 and Comparative Examples 1 to 3 each described above are shown in the following Table 5.

TABLE 5

|  | Na (ppm) | K (ppm) | Li (ppm) | OH group (ppm) | Apparent viscosity {(log n), poise} 1,260° C. |
|---|---|---|---|---|---|
| Example 1 | <0.1 | 0.1 | 0.1 | 0 | 12.7 |
| Example 2 | <0.1 | 0.1 | 0.1 | 0 | 12.6 |
| Comparative Example 1 | <0.1 | 0.1 | 0.1 | 0 | 12.7 |
| Comparative Example 2 | 1.0 | 1.0 | 0.2 | 0 | 12.5 |
| Comparative Example 3 | <0.1 | 0.1 | 0.1 | 80 | 12.3 |

AS is apparent from Table 5 above, opaque silica glass having an alkaline metal element concentration and OH group concentration each falling within the ranges pre-

TABLE 4

| Bubbles diameter (μm) | Example 1 | Example 2 | Comparative Example 1 | Comparative Example 2 | Comparative Example 3 | Comparative Example 4 |
|---|---|---|---|---|---|---|
| 0 to 20 | 24,300 | 67,800 | 5,100 | 6,500 | 900 | 172,000 |
| 21 to 40 | 75,800 | 160,000 | 3,800 | 19,600 | 7,100 | 332,100 |
| 41 to 60 | 51,300 | 98,000 | 8,300 | 21,200 | 8,900 | 304,800 |
| 61 to 80 | 33,800 | 47,100 | 10,200 | 39,200 | 10,600 | 114,700 |
| 81 to 100 | 36,500 | 50,800 | 12,700 | 31,800 | 5,300 | 172,000 |
| 101 to 120 | 21,600 | 30,100 | 15,900 | 23,700 | 6,200 | 62,800 |
| 121 to 140 | 14,800 | 20,700 | 8,900 | 7,300 | 3,500 | 5,500 |
| 141 to 160 | 12,100 | 3,700 | 10,800 | 4,100 | 6,200 | 0 |
| 161 to 180 | 0 | 0 | 1,300 | 0 | 900 | 0 |
| 181 to 200 | 0 | 0 | 1,900 | 0 | 900 | 0 |
| 201 to 220 | 0 | 0 | 1,300 | 0 | 1,800 | 0 |
| 221 to 240 | 0 | 0 | 600 | 0 | 0 | 0 |
| 241 to 260 | 0 | 0 | 0 | 0 | 0 | 0 |
| 261 to 280 | 0 | 0 | 0 | 0 | 0 | 0 |
| 281 to 300 | 0 | 0 | 0 | 0 | 0 | 0 |
| Total (bubbles/cm³) | 270,000 | 478,200 | 80,800 | 153,400 | 62,000 | 1,163,900 |

As can be seen in Tables 3 and 4, opaque silica glass obtained by subjecting quartz grains whose maximum particle diameter was adjusted to a range between 110 μm and 250 μm to alkali removal treatment has a bubble volume which is almost the same as the opaque silica glasses in Comparative Example 1 in which the particle size was not adjusted and Comparative Example 2 in which the alkali removal treatment was not carried out while the particle size was adjusted, but the bubble density is large, which leads to an increase in its thermal shielding effect.

Further, as shown in Table 4, the bubbles contained in the opaque silica glass obtained by using quartz grains having a particle size distribution falling within the range of the present invention are fine compared to those in the comscribed in the present invention have high viscosity at high temperatures and excellent heat resistance.

Samples having a thickness of 4 mm were cut out from the opaque silica glasses prepared in Examples 1 and 2 and the blocks obtained in Comparative Examples 1 to 4, and after polishing the surfaces thereof with #800, the surfaces were burned for finishing with oxyhydrogen flame. These samples were measured for transmittance up to 0.2 to 5 μm with a spectrophotometer for the ultraviolet and visible regions and an infrared spectrophotometer. The results thereof are shown in Table 6.

TABLE 6

| Wavelength (μm) | Example 1 (%) | Example 2 (%) | Comparative Example 1 (%) | Comparative Example 2 (%) | Comparative Example 3 (%) | Comparative Example 4 (%) |
| --- | --- | --- | --- | --- | --- | --- |
| 0.2 | 0 | 0 | 0 | 0 | 0 | 0 |
| 0.5 | 2 | 1 | 3 | 4 | 5 | 1 |
| 1.0 | 4 | 3 | 6 | 8 | 10 | 1 |
| 1.5 | 5 | 4 | 7 | 10 | 15 | 2 |
| 2.0 | 5 | 4 | 7 | 10 | 15 | 2 |
| 2.5 | 4 | 3 | 6 | 10 | 15 | 2 |
| 3.0 | 3 | 2 | 4 | 10 | 15 | 1 |
| 3.5 | 2 | 1 | 3 | 10 | 15 | 1 |
| 4.0 | 1 | 1 | 2 | 5 | 8 | 1 |
| 4.5 | 1 | 1 | 1 | 2 | 2 | 1 |
| 5.0 | 0 | 0 | 0 | 0 | 0 | 0 |

As can be seen in Table 6 above, the opaque silica glasses of the present invention have low infrared transmittance and excellent thermal shielding.

Example 3

Natural quartz grain having a particle size of 100 to 300 μm and an average particle size of about 230 μm was filled into a graphite-made mold having an inside diameter of 260 mm and a height of 300 mm, and was settled in a vacuum furnace to remove air remaining between the particles by vacuum-exhausting to $10^{-2}$ Torr or less. Then, the vacuum in the furnace was broken with nitrogen gas, and the temperature was raised from room temperature to 1,200° C. in one hour, from 1,200° C. to 1,630° C. in 70 minutes and from 1,630° C. to 1,720° C. in 350 minutes while circulating nitrogen gas at a flow amount of 5 l/minute and controlling it so that a lower end portion temperature in a quartz grain-filling layer was always 10° C. higher than an upper end portion temperature. Then, after heating for 50 minutes while maintaining the temperature of the whole quartz grain-filling layer described above at 1720° C., heating was stopped to cool it down to room temperature, and an opaque silica glass block was obtained. Opaque silica glass block thus obtained was cut out in a plate form of about 8 mm, and the bubble density and bubble size thereof were measured, finding that the bubble density was 320,000 bubbles/cm³ and the bubble size fell within a range of 10 to 160 μm. A thermal shielding member prepared using the opaque silica glass of the present invention was not subjected to thermal deformation even during heat treatment over 1,000° C. for a long time such as in the heat treatment of silicon wafers, and sufficient light diffusivity and thermal shielding could be maintained.

Comparative Example 5

The same high purity quartz grain as that used in Example 3 was filled into the graphite mold and heated at the same temperature-increase speed as that in Example 3 without providing a temperature difference, followed by keeping the temperature at 1750° C. for 350 minutes, whereby an opaque silica glass block was produced. The opaque silica glass block thus obtained had gross porosity generated in the vicinity of an upper surface.

Comparative Example 6

The quartz grain was heated in the same atmosphere and temperature-increase condition as in Comparative Example 5 and maintained at 1,850° C. for 3 hours. While it was totally melted, very fine bubbles were fused together in the upper regions, and bubble density was low in the middle and lower regions. In particular, the bubbles at the bottom were large and produced a translucent layer.

Example 4

The quartz grain A having a specific surface area of 0.1 m²/g used in Example 1 was put in an electric furnace having a silica glass tube for a reactor tube, and was subjected to heat treatment in hydrogen chloride/nitrogen of 50:50 at 1,200° C. for one hour to purify alkali metals and the respective elements of iron, magnesium and zirconium. This purified quartz grain A was filled once again into the reactor tube and treated at 900° C. for 3 hours in an atmosphere in which the ratio of ammonia/nitrogen was 50:50 to dope ammonia thereinto. This ammonia-doped quartz grain was filled into a high purity graphite mold having an inside diameter 200 mm×height 200 mm up to a depth of 200 mm, and was settled in a vacuum furnace to remove the air remaining between the particles by vacuum-exhausting to $10^{-2}$ Torr or less. Then, the vacuum in the furnace was broken with nitrogen gas, and the temperature was raised from a room temperature to 1,200° C. at a speed of 20° C./minute, from 1,200° C. to 1,630° C. at 6.14° C./minute and from 1,630° C. to 1,750° C. at 0.34° C./minute while circulating nitrogen at a flow amount of 5 l/minute, followed by maintaining the temperature at 1,750° C. for 50 minutes to vitrify it. After vitrification, the supply of electricity to the furnace was stopped to leave it to cool spontaneously. A sample was cut from the opaque silica glass block thus obtained and was measured to find that bubble density was 478,000 bubbles/cm³, whole bubble volume 8.8%, apparent viscosity (log η) at 1,260° C. was 12.80 poise, nitrogen element concentration was 500 ppm, and OH concentration was 0 ppm, and the bubbles fell within a range of 160 μm or less in terms of diameter. The gas component in the bubbles was 99% nitrogen or more. Further, transmittance in the infrared region was low, and its thermal shielding property was excellent.

Example 5

A silica glass molding frame 3 having a outside diameter of 270 mm, thickness of 4 mm and height of 300 mm was inserted in a graphite-made mold 2 having an inside diameter of 270 mm and height of 300 mm, as shown in FIG. 1. quartz grain 1 having a particle size of 50 to 200 μm, the average particle size thereof being 100 mm, and a bulk density of 1.4 g/cm³ was filled into this silica glass molding frame and settled in an electrical furnace 4 equipped with a heater 5 to remove air remaining between the particles by vacuum-exhausting to $10^{-2}$ Torr or less. Then, the vacuum in the furnace was broken with nitrogen gas, and the temperature was raised up to 1,200° C. in 120 minutes, from 1,200° C. to 1,630° C. in 90 minutes and from 1,630° C. to 1,750° C. in 240 minutes while circulating nitrogen gas at a flow amount of 5 l/minute. Then, after heating for 60 minutes while maintaining the temperature at 1,750° C., heating was stopped to cool it down to room temperature, obtaining an opaque silica glass block. A disc of about 4 mm was cut from opaque silica glass block thus obtained, and the surface thereof was burned for finishing with oxyhydrogen flame to prepare a sample. The sample was measured for infrared ray transmittance in a range of 0.2 to 5 μm, finding that the transmittance was 5% or less, and abnormal foaming and inclusions were not found. Samples having a thickness of 4 mm were cut out from the opaque silica glass block described above and the opaque silica glass block prepared in Example 1, and after polishing the surfaces thereof with #800, the surfaces were burned for finishing with oxyhydrogen flame. The samples thus obtained were measured for transmittance distribution in the lateral direction in 2 μm by every 1 cm from the center to the outside of the sample. The results thereof are shown in Table 7.

TABLE 7

| Measuring point (cm) | Example 1 (%) | Example 5 (%) |
| --- | --- | --- |
| 0 from center | 5 | 5 |
| 1 | 6 | 4 |
| 2 | 6 | 5 |
| 3 | 7 | 4 |
| 4 | 8 | 5 |
| 5 | 8 | 3 |
| 6 | 7 | 4 |
| 7 | 6 | 5 |
| 8 | 8 | 5 |
| 9 | 10 | 4 |
| 10 | 15 | 5 |
| 11 | — | 5 |
| 12 | — | 6 |
| 13 | — | 7 |

As can be found from the results shown in the above Table 7, in the case where a silica glass tube was inserted in the graphite mold, evenness in the distribution of transmittance in a lateral direction was improved while the diameter of the opaque silica glass was increased.

Example 6

Natural quartz grain having a particle size of 50 to 200 μm, an average particle size of about 100 μm and a bulk density of 1.4 g/cm³ was poured into a graphite-made mold having an inside diameter of 280 mm and a height of 500 mm. The graphite mold charged with quartz grain was set inside a graphite heating crucible having an inner diameter of 400 mm, and was placed on a graphite table of a lift attached to a lower cover of a furnace. The table was shifted upwardly or downwardly and the lower cover was closed to assure gas tightness of the space in the furnace, before the inner space of the furnace was evacuated to a reduced pressure of 10⁻² Torr or less to remove air remaining between the particles by vacuum-exhausting. Then, the vacuum in the furnace was broken with nitrogen gas introduced thereinto and heat treatment was conducted while circulating the nitrogen gas at a flow amount of 5 l/minute. In such a nitrogen gas atmosphere, an induction coil of 600 mm in diameter having turns like a single-phase solenoid were movably set and high-frequency power was supplied through coaxial cables that went through the furnace body. Heating of the graphite heater by high frequency power was started after the lower end of the graphite mold placed on the table of the lift was adjusted by being moved upwardly or downwardly to horizontally align with the upper end of the induction coil. The temperature was raised from room temperature up to 1,200° C. in 120 minutes, from 1,200° C. to 1,630° C. in 90 minutes and from 1,630° C. to 1,730° C. in 180 minutes. When the temperature raised to 1,730° C., the graphite mold was started to be continuously shifted down at a moving rate of 0.5 mm/min with the lift attached thereto. Then, after heating for 600 minutes while maintaining the temperature of the quartz grain described above at 1,730° C., heating was stopped to cool it down to room temperature, and an opaque silica glass block was taken out of the furnace opening the lower cover. Thus obtained opaque silica glass block was of a diameter of 280 mm and length of 270 mm. The opaque silica glass block was cut out to prepare 50 pieces of opaque silica glass plate of 4 mm thick, and the plates were measured about a bubble density, cross sectional area of the bubbles, and bubble distribution, finding that the bubble density was 620,000 bubbles/cm³ and the cross sectional area of the bubbles fell within a range of 10 to 160 μm, especially a group of bubbles belonging to a range of 21 to 100 μm was contained with a particularly high concentration.

Comparative Example 7

The same natural quartz grain as that used in Example 6 was filled into the graphite mold and heated at the same temperature-increase condition as that in Example 6. The graphite mold was shifted downwardly at a moving rate of 5 mm/min with the help of a lift attached to a lower cover of the furnace. Heating was stopped to cool it down to room temperature, and an opaque silica glass block was taken out of the furnace opening the lower cover. Cracks were generated almost across the entire length along the direction from the upper portion to the lower portion. Plates of 4 mm thick were cut out, and inspected and a plurality of cracks running from the outer periphery to the central portion were observed, so that a number of plates were inferior in quality and unable to be put to use.

What is claimed is:

1. A high purity opaque silica glass containing silica and having a density of from 2.0 to 2.18 g/cm³, wherein the concentration of each of sodium and potassium elements contained therein is 0.5 ppm or less, the concentration of OH groups contained therein is 30 ppm or less, and bubbles contained therein are independent ones having the following physical values:

(1) a bubble diameter of 160 μm or less, and (2) a bubble density of 100,000 to 1,000,000 bubbles/cm³.

2. The high purity opaque silica glass of claim 1, wherein the transmissivity of light of a wavelength of 0.2 to 5 μm through an opaque silica glass having a thickness of 4 mm is 20% or less.

3. A high purity opaque silica glass containing silica and having a density of from 2.0 to 2.18 g/cm³, wherein the concentration of each of sodium and potassium elements contained therein is 0.5 ppm or less, the concentration of OH groups contained therein is 30 ppm or less, the concentration of nitrogen element contained therein is 50 to 500 ppm, and bubbles contained therein are independent ones having the following physical values:

(1) a bubble diameter of 160 μm or less, and (2) a bubble density of 100,000 to 1,000,000 bubbles/cm³.

4. The high purity opaque silica glass of claim 3, wherein the transmissivity of light of a wavelength of 0.2 to 5 μm through an opaque silica glass having a thickness of 4 mm is 20% or less.

\* \* \* \* \*